United States Patent
Kwon et al.

(10) Patent No.: US 11,695,822 B2
(45) Date of Patent: Jul. 4, 2023

(54) UNIFIED INTEGRATION PATTERN PROTOCOL FOR CENTRALIZED HANDLING OF DATA FEEDS

(71) Applicant: ADP, Inc., Roseland, NJ (US)

(72) Inventors: Bryant Kwon, Fullerton, CA (US); Joseph E Dela-Cruz, Diamond Bar, CA (US); Younik Lee, Buena Park, CA (US)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 17/377,682

(22) Filed: Jul. 16, 2021

(65) Prior Publication Data

US 2023/0018043 A1    Jan. 19, 2023

(51) Int. Cl.
*H04L 67/06* (2022.01)
*H04L 67/1074* (2022.01)
*H04L 67/1097* (2022.01)
*H04L 67/133* (2022.01)

(52) U.S. Cl.
CPC .......... *H04L 67/06* (2013.01); *H04L 67/1074* (2013.01); *H04L 67/1097* (2013.01); *H04L 67/133* (2022.05)

(58) Field of Classification Search
CPC ..... H04L 67/06; H04L 67/40; H04L 67/1074; H04L 67/1097
See application file for complete search history.

(56) References Cited

U.S. PATENT DOCUMENTS

| | | | | |
|---|---|---|---|---|
| 9,378,386 | B1* | 6/2016 | Saylor | G06F 21/6209 |
| 9,465,551 | B1* | 10/2016 | Donlan | G06F 11/00 |
| 9,626,372 | B2* | 4/2017 | von Elgg | H04N 21/6125 |
| 9,800,680 | B2* | 10/2017 | Cao | H04L 51/04 |
| 9,882,985 | B1* | 1/2018 | Esam | H04L 67/1097 |
| 9,985,948 | B2* | 5/2018 | Kuroyanagi | H04W 12/086 |
| 10,132,757 | B2* | 11/2018 | Okuno | H01L 21/67288 |

(Continued)

FOREIGN PATENT DOCUMENTS

| | | | |
|---|---|---|---|
| CN | 101267364 A | * | 9/2008 |
| CN | 108289126 A | * | 7/2018 |

(Continued)

*Primary Examiner* — Shean Tokuta
(74) *Attorney, Agent, or Firm* — Andrew M. Calderon; Calderon Safran & Cole, P.C.

(57) ABSTRACT

System and methods are provided for implementing a Unified Integration Pattern (UIP) protocol for centralized handling of data feeds between client systems. In embodiments, a method includes: receiving an authentication Application Program Interface (API) message and data file transfer request for a data transfer event from a sending client system in a network of distinct client systems; authenticating the sending client system based on the authentication API message; uploading a data file from the sending client system based on the authenticating; receiving a notification API message from the sending client system indicating that that uploading of the data file to the computer system is complete; sending the data file to a receiving client system in the network of distinct client systems based on API message and data file request and the notification API message; and sending a notification message to the sending client system regarding the data transfer event.

20 Claims, 9 Drawing Sheets

(56) References Cited

U.S. PATENT DOCUMENTS

| | | | | |
|---|---|---|---|---|
| 10,558,581 B1* | 2/2020 | Lazier | | G06F 21/6218 |
| 11,265,360 B2* | 3/2022 | Forrest | | G06F 21/6245 |
| 2003/0084306 A1* | 5/2003 | Abburi | | G06F 21/10 |
| | | | | 713/188 |
| 2013/0223337 A1* | 8/2013 | Choo | | H04W 60/00 |
| | | | | 370/328 |
| 2013/0282865 A1* | 10/2013 | Baptist | | H04L 67/51 |
| | | | | 709/217 |
| 2014/0149362 A1* | 5/2014 | Kearns | | H04L 67/06 |
| | | | | 707/691 |
| 2014/0258430 A1* | 9/2014 | Choi | | H04L 51/08 |
| | | | | 709/206 |
| 2014/0279846 A1* | 9/2014 | Srinivasan | | G06Q 10/107 |
| | | | | 707/608 |
| 2014/0289290 A1* | 9/2014 | von Elgg | | G06F 16/166 |
| | | | | 707/827 |
| 2015/0074766 A1* | 3/2015 | Li | | H04L 63/10 |
| | | | | 726/4 |
| 2015/0154211 A1* | 6/2015 | Matsubara | | H04L 67/01 |
| | | | | 707/812 |
| 2016/0042004 A1* | 2/2016 | Kawamoto | | G06F 3/1454 |
| | | | | 715/739 |
| 2016/0057199 A1* | 2/2016 | Aziz | | H04L 51/10 |
| | | | | 709/204 |
| 2016/0234291 A1* | 8/2016 | Fang | | H04L 51/08 |
| 2017/0177609 A1* | 6/2017 | North | | H04L 67/06 |
| 2017/0187888 A1* | 6/2017 | Shukla | | H04M 15/852 |
| 2018/0032359 A1* | 2/2018 | Roy | | G06F 9/45533 |
| 2018/0084560 A1* | 3/2018 | Cho | | H04W 12/106 |
| 2018/0131470 A1* | 5/2018 | Padmanabhan | | G06F 3/0661 |
| 2018/0213447 A1* | 7/2018 | Hiramatsu | | H04W 36/32 |
| 2019/0110188 A1* | 4/2019 | Dunjic | | G06F 16/27 |
| 2019/0320022 A1* | 10/2019 | Raghunath | | G06F 3/067 |
| 2020/0076963 A1* | 3/2020 | Ishida | | G06F 3/1204 |
| 2020/0252768 A1* | 8/2020 | Staub | | H04W 4/40 |
| 2020/0296013 A1* | 9/2020 | Rouhi | | H04B 7/0452 |
| 2020/0311034 A1* | 10/2020 | Brand | | G06F 16/13 |
| 2020/0314165 A1* | 10/2020 | Brand | | H04L 67/1097 |
| 2020/0344299 A1* | 10/2020 | Sohail | | G06F 3/067 |
| 2021/0042767 A1* | 2/2021 | Guan | | G06Q 30/0255 |
| 2021/0126955 A1* | 4/2021 | Nagaoka | | H04L 12/1822 |
| 2021/0134406 A1* | 5/2021 | Manuel | | G16H 10/60 |
| 2021/0234917 A1* | 7/2021 | Joheb | | H04L 67/1097 |
| 2021/0241869 A1* | 8/2021 | Muse | | G06F 9/542 |
| 2021/0248514 A1* | 8/2021 | Cella | | G06N 7/01 |
| 2021/0326782 A1* | 10/2021 | Achin | | G06F 9/5011 |
| 2022/0054008 A1* | 2/2022 | Venkatraman | | G16H 50/70 |
| 2023/0018043 A1* | 1/2023 | Kwon | | H04L 67/06 |

FOREIGN PATENT DOCUMENTS

| | | | | |
|---|---|---|---|---|
| EP | 3324698 A1 * | 5/2018 | | H04W 12/08 |
| ES | 2702103 T3 * | 2/2019 | | H04L 12/189 |
| JP | 2010004196 A * | 1/2010 | | |
| JP | 2016134632 A * | 7/2016 | | |
| WO | WO-2016076293 A1 * | 5/2016 | | H04L 61/30 |

* cited by examiner

UNIFIED INTEGRATION PATTERN PROTOCOL FOR CENTRALIZED HANDLING OF DATA FEEDS

TECHNICAL FIELD

The present disclosure relates generally to data file transmissions between computing systems and, more particularly, to a method and system for handling real-time data feeds between distinct client systems using a centralized data transmission hub.

BACKGROUND

Cloud-based platforms enable the transmission of data between distinct software applications and/or computer systems. Various approaches have been taken regarding integrating distinct software or computing components into an existing cloud-based platform.

Existing legacy integration strategies often take the shortest path to data delivery at the expense of resiliency and ease of maintenance. As an example, a system may have an existing dependency on insecure file transfer protocol (FTP) service between a mainframe and a payment gateway, or insecure socket application programming interface (API) calls from a payment gateway to a private cloud appliance, etc. In such scenarios, knowledge gaps and bandwidth constraints of a product engineering team due to attrition, sub-par planning, poor collaboration and/or lack of operational transparency often drive product engineering teams to prioritize convenience over pushing for a viable long term solution.

Also, each product engineering team may have their own disparate internal standards (if standards exist) or unpublished standards for application-to-application integration, which may lack a holistic strategy for a domain-agnostic integration pattern that could be utilized and re-used by all client systems while reducing support overhead for the supporting service and infrastructure to an existing centralized enterprise engineering team. In such scenarios, in the event of a backend system outage, the impact to a business transmission is variable in nature, making it difficult to troubleshoot and isolate the root cause of a transmission failure. In such cases, recovery cycle times may take hours on average and involved engineers and support teams across multiple business unit, product, and operations teams to analyze and remediate.

SUMMARY

In a first aspect of the present disclosure, a method for implementing a unified integration pattern (UIP) protocol for file transfers between distinct client systems includes: receiving, by a computer system, an authentication Application Program Interface (API) message and data file transfer request for a first data transfer event from a sending client system in a network of distinct client systems; authenticating, by the computer system, the sending client system based on the authentication API message and data file transfer request; uploading, by the computer system, a first data file from the sending client system based on the authenticating the sending client system; receiving, by the computing system, a notification API message from the sending client system indicating that that uploading of the first data file to the computer system is complete; sending, by the computer system, the first data file to a receiving client system in the network of distinct client systems based on API message and data file request and the notification API message; and sending, by the computer system, a notification message to the sending client system regarding the first data transfer event.

In another aspect of the present disclosure, there is a computer program product including one or more computer readable storage media having program instructions collectively stored on the one or more computer readable storage media. The program instructions are executable to cause a client system within a cloud platform to: perform an unified integration pattern (UIP) protocol for a first real-time data transfer event by: sending an authentication message and data file transfer request to a file-based data transmission hub for authentication by the file-based data transmission hub, wherein the data file transfer request indicates a receiving client system to receive a first data file; uploading the first data file to the file-based data transmission hub; sending a first notification message to the file-based data transmission hub indicating that the uploading of the first data file to the file-based data transmission hub is complete; and receiving a second notification message from the file-based data transmission hub indicating that the first data file has been transmitted to the receiving client system.

In a further aspect of the present disclosure, there is a computer system including a processor, a computer readable memory, one or more computer readable storage media, and program instructions collectively stored on the one or more computer readable storage media. The program instructions are executable to perform an unified integration pattern (UIP) protocol for a first data file transfer event by: receiving an authentication Application Program Interface (API) message and data file transfer request from a sending client system in a network of distinct client systems; authenticating the sending client system based on the authentication API message; uploading a first data file from the sending client system based on the authenticating the sending client system; receiving a notification API message from the sending client system indicating that the uploading of the first data file to the computer system is complete; sending to a receiving client system a notification that the first data file is ready to be transmitted; receiving a second authentication API message from the receiving client system in response to the notification that the first data file is ready to be transmitted; authenticating the receiving client system based on the second authentication API message; sending the first data file to the receiving client system for downloading by the receiving client system based on the authenticating the receiving client system; receiving a second notification API message from the receiving client system indicating that the downloading of the first data file has been completed; and sending a notification message to the sending client system indicating that the first data transfer event has been completed.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION OF ASPECTS OF THE INVENTION

Figure 1:
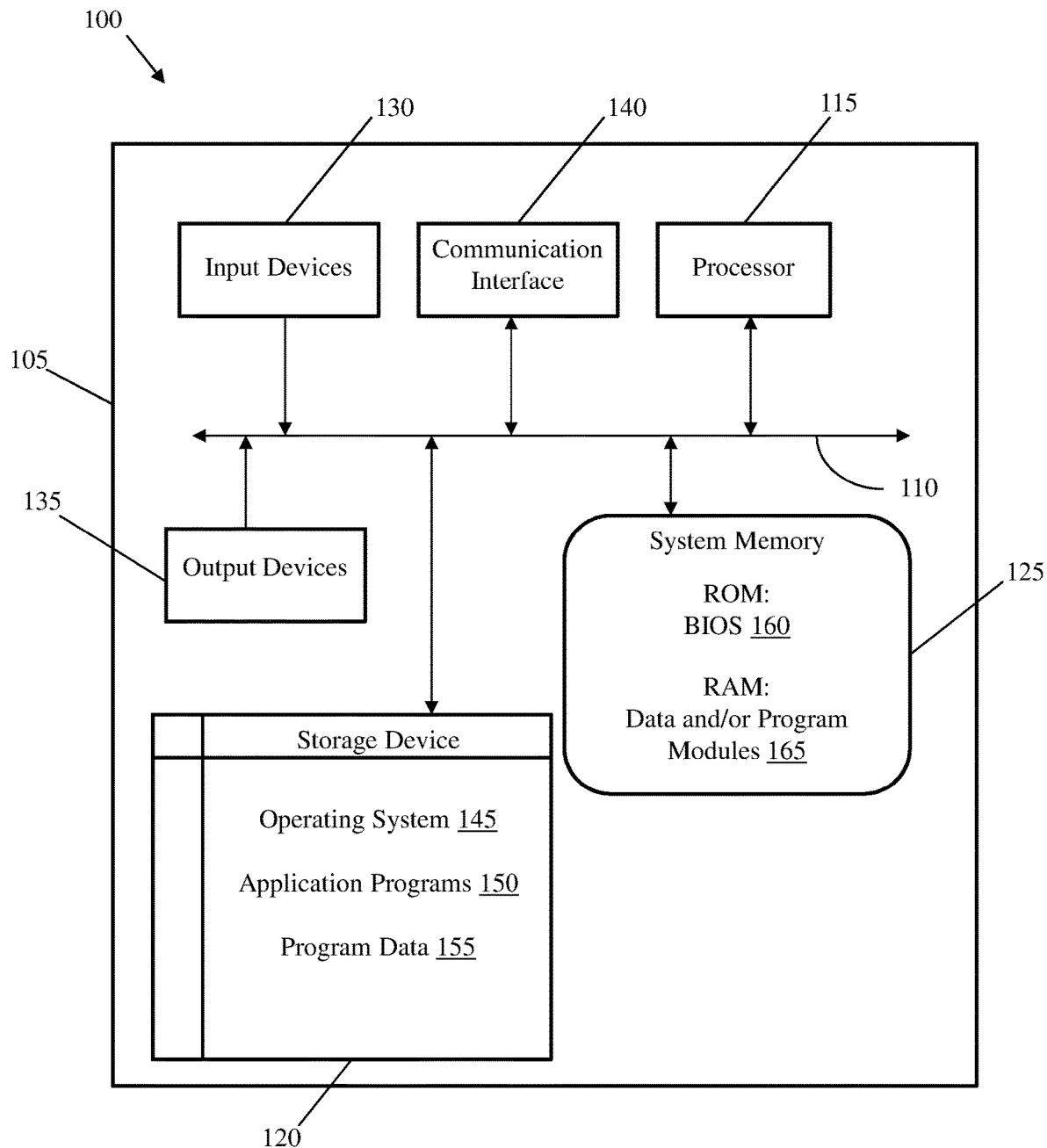
FIG. 1 is an illustrative architecture of a computing system implemented in embodiments of the present disclosure.

The present disclosure relates generally to data file transmissions between computing systems and, more particularly, to a method and system for handling real-time data feeds between distinct client systems using a centralized data transmission hub. The term distinct client system as used herein refers to a system that produces or initiates data transfer events (e.g., via event-driven applications) to transfer a data file to another distinct client system. In implementations, each distinct client system comprises a software application configured to provide one or more cloud-based services to consumers. In aspects of the disclosure, each distinct client system may be a stand-alone system integrated into a network platform to provide a distinct set of services within the network platform. In embodiments, each distinct client system may comprise one or more computing devices (e.g., servers, storage devices, etc.).

In accordance with aspects of the present disclosure, a unified integration pattern (UIP) protocol is utilized to enable data file transfers between distinct client systems on a cloud services platform or other networked or stand-alone system, while also enabling integration between the distinct client systems and backend products residing in legacy data centers. In implementations, a unified high-throughput, low-latency platform is provided for handling real-time data feeds of event-driven applications via centralized messaging systems (event streaming modules) of client systems, and software development kit (SDK) reference implementations to accelerate legacy domain controller (DC) backend integrations to the cloud services platform.

Advantageously, aspects of the present disclosure provide a re-usable unified integration pattern (UIP) protocol for use across distinct client systems that enables identification of transmission failures via a centralized file-based data transmission hub. Thus, aspects of the present disclosure address the technical problem of identifying transmission errors across systems and applications integrated into a cloud services platform by proving a technical solution of a UIP protocol managed by a centralized file-based data transmission hub.

Also, implementations of the systems and methods described herein reduce integration complexity and operational support overhead from many integration protocols for distinct client systems to one standard integration protocol (UIP protocol). The use of one integration solution for participating client systems also improves resiliency, maintainability, stability, performance, observability, and scalability via the exchange of meta data (e.g., via messages/notifications). Moreover, implementations of the systems and methods described herein eliminate core application service dependencies on backend (server side) availability, and enables rapid onboarding and adoption by software products across business units requiring the benefits of the services of the cloud services platform. For example, embodiments of the systems and methods described herein enable business integrations between software products and retail, commercial, banking and government clients of a cloud services platform.

Implementations of the present disclosure may be a system, a method, and/or a computer program product. The computer program product may include a computer readable storage medium (or media) having computer readable program instructions thereon for causing a processor to carry out aspects of the present disclosure.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
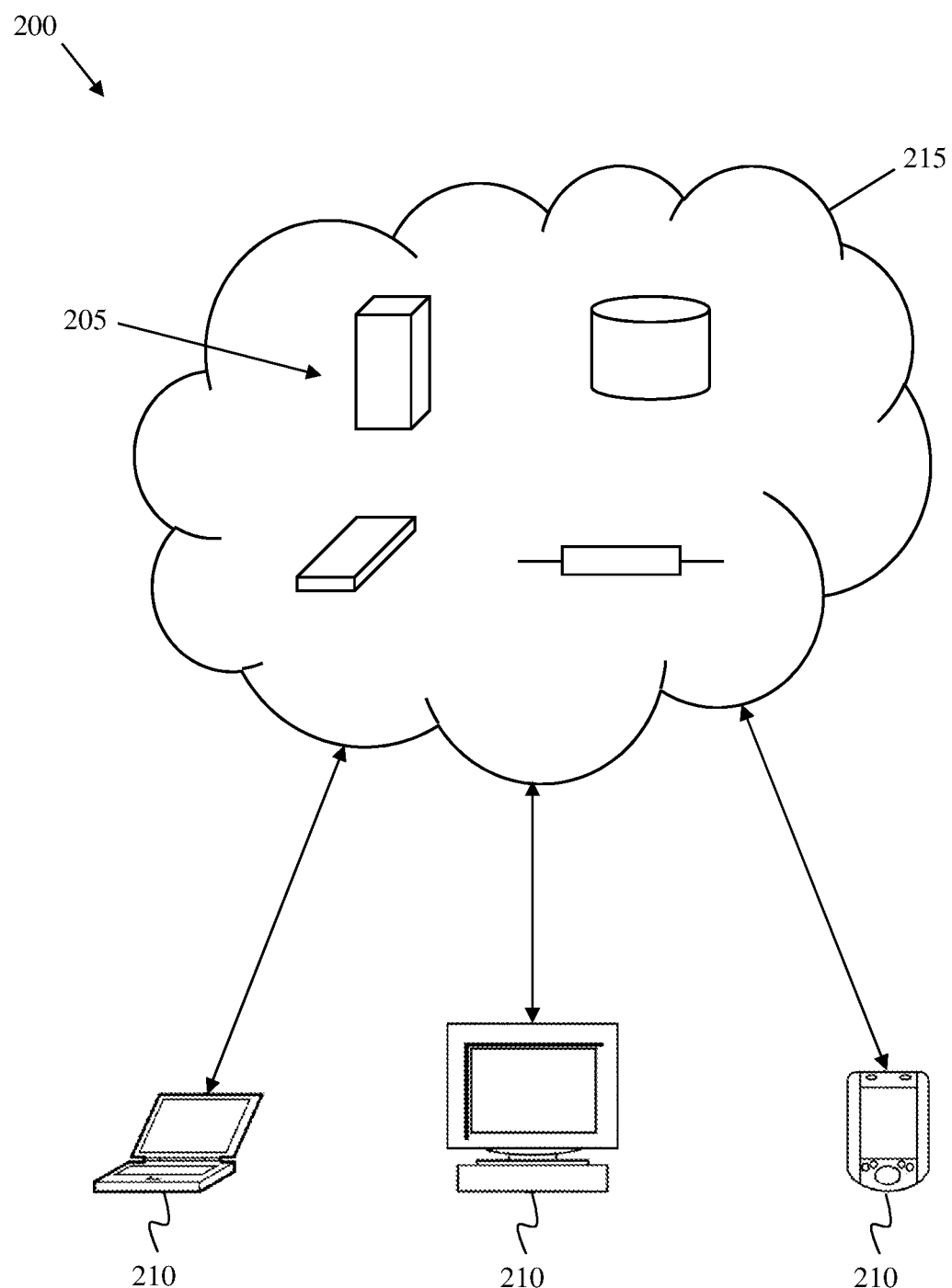
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions. For example, processor 115 enables the computing device 105 to provide data transmission services between distinct client systems and/or devices as described in more detail herein.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured as a special-purpose computing device providing data file transmission services between distinct client systems (e.g., software applications and/or computing devices). In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction.

Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
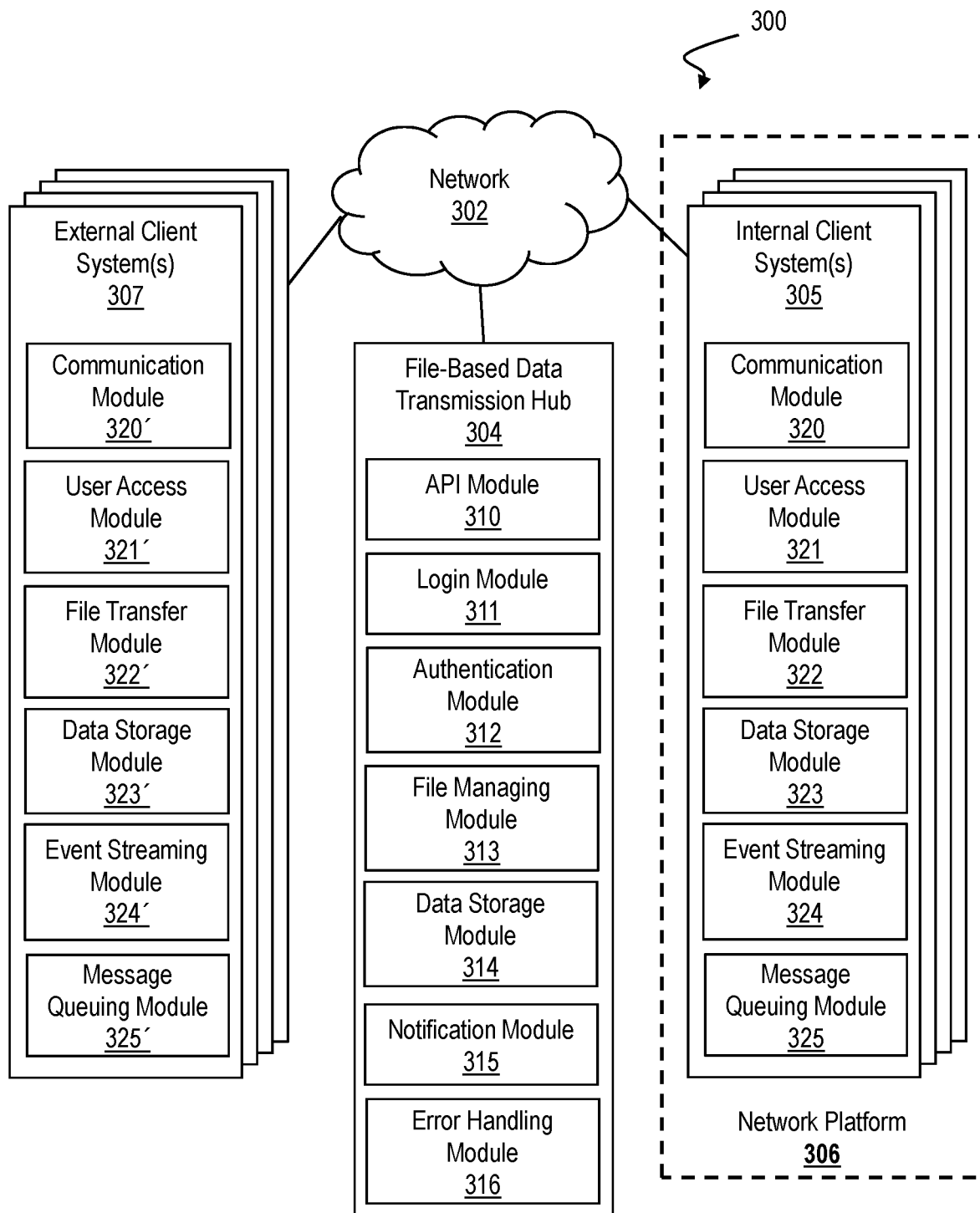
FIG. 3 is a block diagram illustrating an exemplary integration environment in accordance with aspects of the present disclosure.

FIG. 3 shows a block diagram in accordance with aspects of the present disclosure. More specifically, FIG. 3 depicts an exemplary integration environment 300 that illustrates functionality of aspects of the present disclosure. The environment 300 includes a network 302 (e.g., Internet) interconnecting a file-based data transmission hub 304 with one or more internal client systems 305 of a network platform 306, and one or more external client systems 307 outside of the network platform 306. In implementations, the file-based data transmission hub 304 provides data file transmission services between an internal client system of the network platform 306 and another internal client system of the network platform 306, or between the internal client system and an external client system.

Each of the file-based data transmission hub 304, internal client system(s) 305, and external client systems 307, may comprise one or more cloud resources 205 within the cloud computing environment 200 of FIG. 2, and may comprise one or more computing devices including the elements of computing device 105 of FIG. 1. In implementations, the network platform 306 may be a cloud network platform enabling one or more of the internal client systems 305 to provide cloud-based services to consumers (e.g., via the client devices 210 of FIG. 2) or services to internal consumers via a local area network (LAN) or wide area network (WAN) or virtual private cloud (VPC) as further non-limiting examples. In one example, the network platform 306 is a human resources platform providing business services to client devices 210 in the cloud environment 200 of FIG. 2.

The file-based data transmission hub 304 comprises one or more modules for performing functions in accordance with embodiments of the present disclosure. In implementations, the file-based transmission hub 304 includes one or more of: an API module 310, a login module 311, an authentication module 312, a file managing module 313 in communication with a data storage module 314, a notification module 315, and an error handling module 316, each of which may comprise one or more program modules such as program modules 165 described with respect to FIG. 1.

In implementations, the file managing module 313 of the file-based transmission hub 304 is configured to determine a status of data transfer events based on data collected during implementations of UIP file transfer protocols in accordance with embodiments of the present disclosure. In embodiments, the error handling module 316 of the file-based transmission hub 304 is configured to determine at what point in a data transfer event the event failed. For example, the error handling module 316 may determine based on data collected during the implementation of UIP file transfer protocols: 1) if authentication of a sending client system failed; 2) if a download of data file failed; 3) if authentication of the receiving client system failed; or 4) if an upload of a data file failed.

Figure 6A:
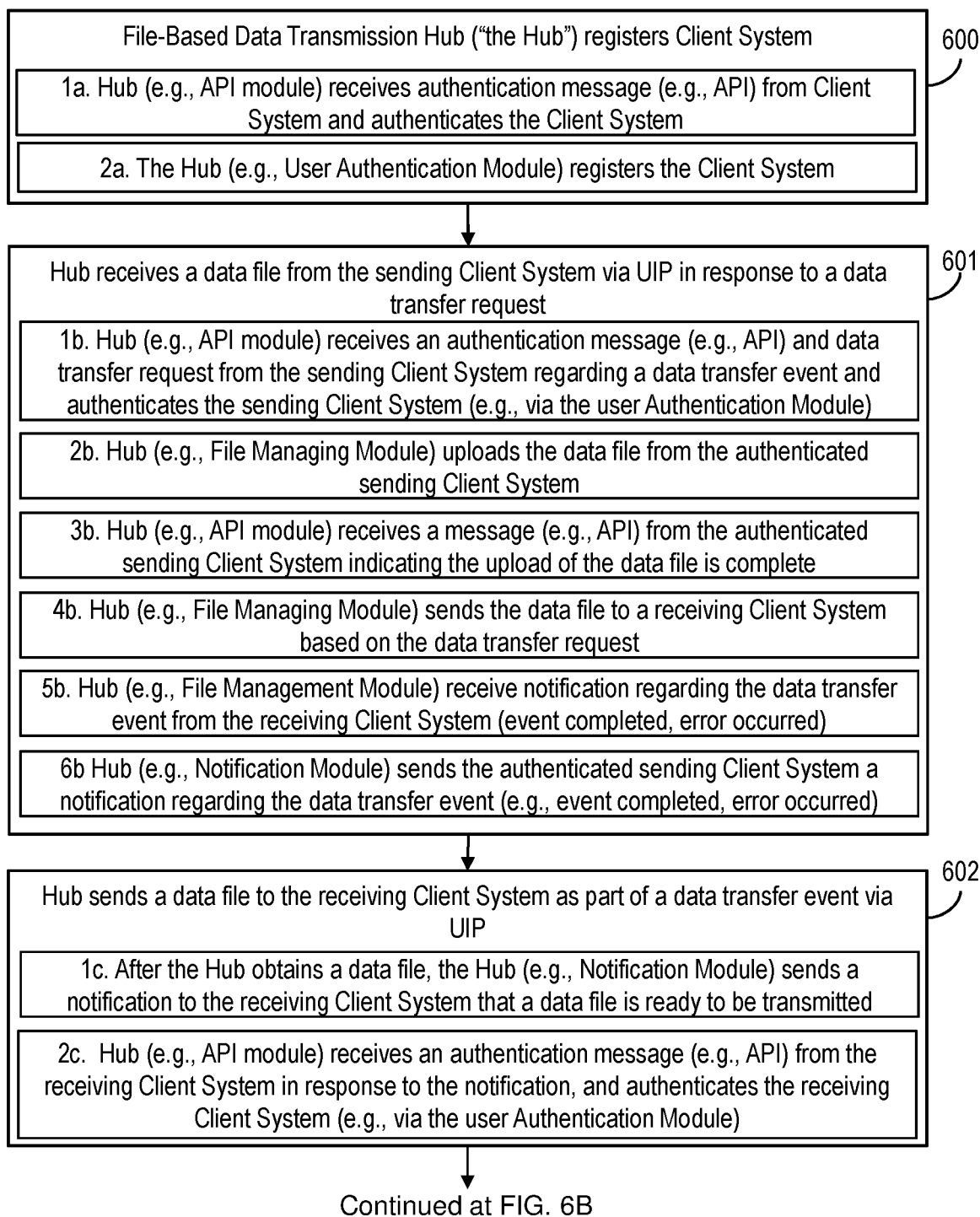
FIGS. 6A and 6B depict an exemplary flow for protocol processes in accordance with aspects of the present disclosure.

Each of the internal client systems 305 may comprise one or more modules for performing functions in accordance with embodiments of the present disclosure. In implementations, each of the internal client systems 305 include one or more of: a communication module 320, a user access module 321, a file transfer module 322, a data storage module 323, an event streaming module 324, and a message queuing module 325, each of which may comprise one or more program modules such as program modules 165 described with respect to FIG. 1. Similarly, each of the external client systems 307 may comprise one or more modules for performing functions in accordance with embodiments of the invention. In implementations, each of the external client systems 307 include one or more of: a communication module 320', a user access module 321', a file transfer module 322', a data storage module 323', an event streaming module 324', and a message queuing module 325', each of which may comprise one or more program modules such as program modules 165 described with respect to FIG. 1. Functions of the above-identified modules will be discussed in more detail below, with respect to FIGS. 6A and 6B.

The file-based data transmission hub 304, internal client systems 305 and external client systems 307, may each include additional or fewer modules than those shown in FIG. 3. In embodiments, separate modules may be integrated into a single module. Additionally, or alternatively, a single module may be implemented as multiple modules. Moreover, the quantity of devices and/or networks in the environment is not limited to what is shown in FIG. 3. In practice, the environment 300 may include additional devices and/or networks; fewer devices and/or networks; different devices and/or networks; or differently arranged devices and/or networks than illustrated in FIG. 3. Moreover, each of the file-based data transmission hub 304, internal client systems 305 and external client systems 307, may each comprise one or more computing devices (e.g., one or more computing devices including the components of the computing device 105 in FIG. 1).

Figure 4:
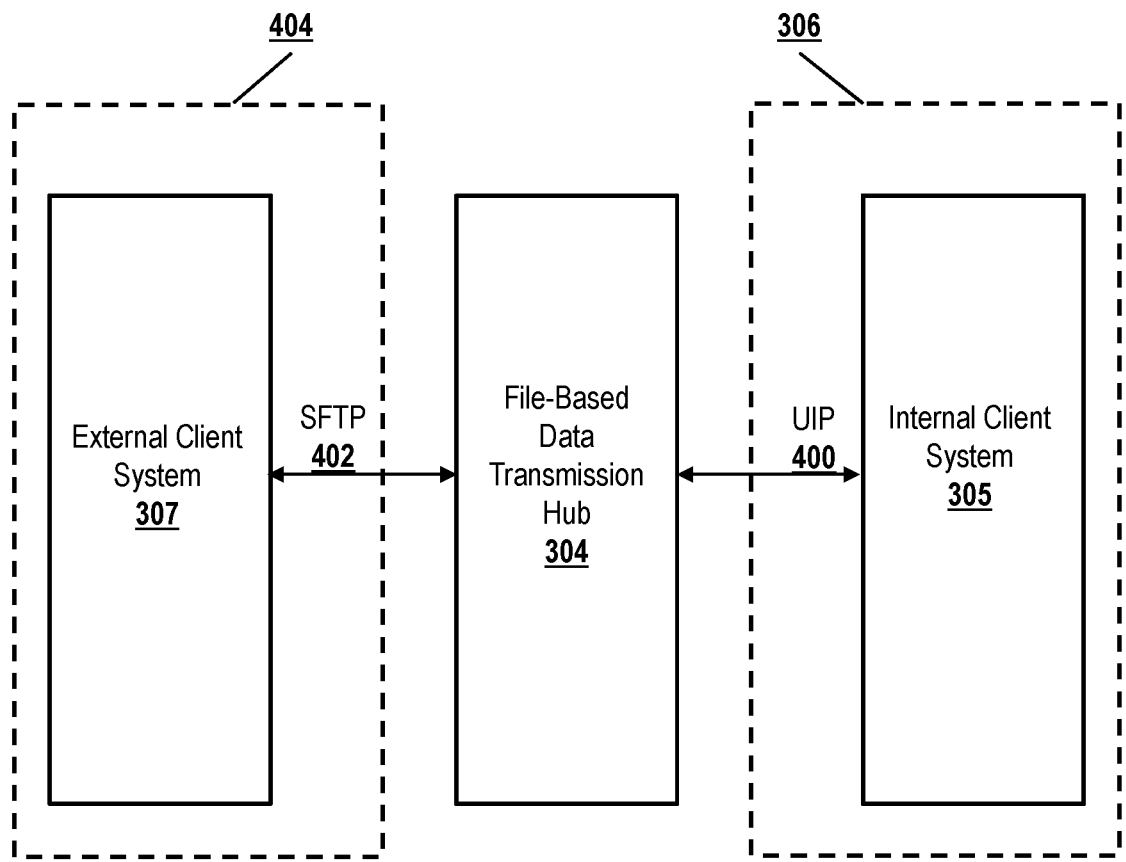
FIG. 4 is a block diagram representing an exemplary exchange of data in accordance with aspects of the present disclosure.

FIG. 4 is a block diagram representing an exemplary exchange of data in accordance with aspects of the present disclosure. More specifically, FIG. 4 shows the file-based data transmission hub 304 communicating with the client system 305 on the network platform 306 via the UIP protocol 400, in accordance with embodiments of the present disclosure. Additionally, FIG. 4 shows the file-based data transmission hub 304 communicating with external client systems 307 outside of the network platform 306 (as represented at 404) via Secure File Transfer Protocol (SFTP) 402, in accordance with embodiments of the present disclosure.

Figure 5A:
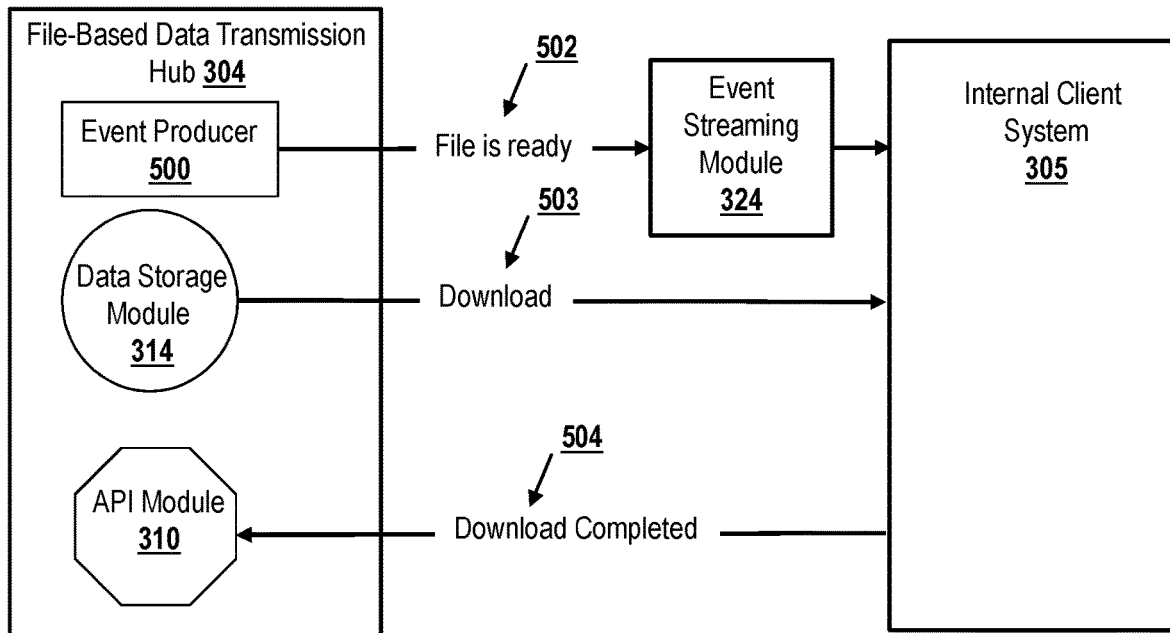
FIG. 5A is a block diagram representing an exemplary client downloading event in accordance with aspects of the present disclosure.

FIG. 5A is a block diagram representing an exemplary client downloading event in accordance with aspects of the present disclosure. More specifically, FIG. 5A shows the file-based data transmission hub 304 including an event producer 500, which represents a portion of the file managing module 313 handling a real-time data file transmission event initiated by a client system using the file-based data transmission hub 304 (e.g., an external or internal client system). In embodiments, at step 502, the file-based data transmission hub 304 sends a notification to the event streaming module 324 of the internal client system 305, indicating that a data file is ready to be downloaded by the internal client system 305. In embodiments, at step 503 the internal client system 305 downloads the file from the data storage module 314 of the file-based data transmission hub 304. In implementations, at step 504, the internal client system 305 sends an API message to the API module 310 of the file-based data transmission hub 304 indicating that the downloading of the file has been completed by the internal client system 305.

Figure 5B:
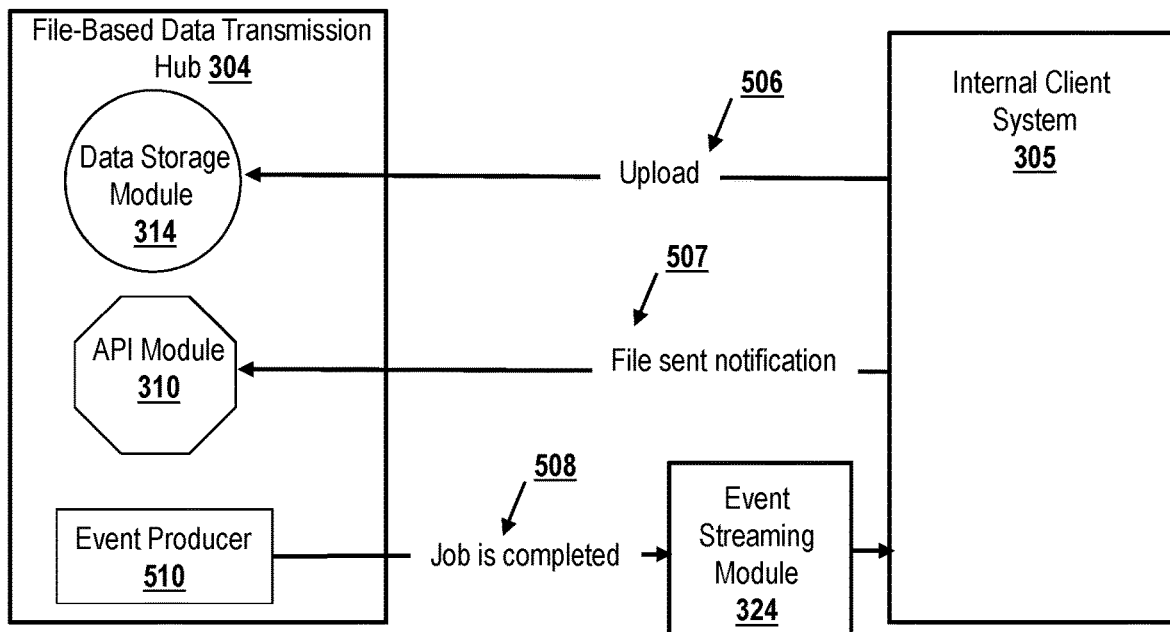
FIG. 5B is a block diagram representing an exemplary client uploading event in accordance with aspects of the present disclosure.

FIG. 5B is a block diagram representing an exemplary client uploading event in accordance with aspects of the present disclosure. As depicted in FIG. 5B, in embodiments, the internal client system 305 uploads a data file to the data storage module 314 of the file-based data transmission hub 304 as part of a real-time data file transmission event initiated by the internal client system 305. In implementations, at step 507, the internal client system 305 sends an API message to the API module 310 of the file-based data transmission hub 304 indicating that the uploading of the file to the data storage module 323 has been completed. An event producer 510 in FIG. 5B represents a portion of the file managing module 313 handling the real-time data file transmission event initiated by the internal client system 305. In embodiments, at step 508, the event producer 510 sends a message to the event streaming module 324 of the internal client system 305 indicating that the job has been completed.

FIG. 6 depicts an exemplary flow for UIP protocol processes in accordance with aspects of the present disclosure. The exemplary flow can be illustrative of a system, a method, and/or a computer program product and related functionality implemented on the computing system of FIG. 1, in accordance with aspects of the present disclosure. The computer program product may include computer readable program instructions stored on computer readable storage medium (or media). The computer readable storage medium may include the one or more storage medium as described with regard to FIG. 1, e.g., non-transitory media, a tangible device, etc. The method, and/or computer program product implementing the flow of FIG. 6 can be downloaded to respective computing/processing devices, e.g., computing system of FIG. 1 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

In accordance with the example of FIG. 6, UIP protocol 400 provides for the following functions: 1) sending data files from the file-based data transmission hub 304 to one or more client systems (e.g., 305, 307); 2) receiving data files at the file-based transmission hub 304 from the one or more client systems; 3) registering the one or more client systems with the file-based transmission hub 304; and 4) providing status updates from the file-based transmission hub 304 to the one or more client systems. Each of the above-identified functions requires a separate authentication of the participating client system, and use of the UIP protocol 400 enables the file-based transmission hub 304 to track the progress of file transfer events between participating client systems (e.g., 305, 307). In embodiment, messaging between the client systems 305 or 307 and the file-based transmission hub 304 is automated via APIs. In implementations, the client systems (e.g., 305 or 307) comprise at least one event-driven application configured to generate real-time data transfer events for transferring data files to another client system.

In embodiments, at step 600 the file-based transmission hub 304 registers a client system (e.g., 305 or 307), enabling the client system to utilize the UIP protocol 400. In embodiments, the client system is an internal client system 305 of the network platform 306. In implementations, the client system can also be an external client system 307 outside of the network platform 306. In aspects of the present disclosure, the file-based transmission hub 304 includes a software development kit (SDK) including APIs providing interfaces for communicating with the client systems. In implementations, the file-based transmission hub 304 provides a reusable notification API for an integration platform, enabling separate file actions versus notifications. In embodiments, step 601 includes the following substeps 1a-2a.

At substep 1a, the file-based transmission hub 304 (e.g., the API module 310 of the file-based transmission hub 304) receives an authentication message (e.g., an API message) from the client system (e.g., 305, 307), and the file-based transmission hub 304 authenticates the client system. In implementations, the API module 310 of the file-based transmission hub 304 is configured to receive and process requests (API calls) from the communication module (e.g., 320, 320') of the internal and/or external client systems 305, 307 according to substep 1a.

The API module 310 may include an API gateway configured to receive API calls and route them to an appropriate API or APIs, and receive and deliver responses to the requests to the user or device that made the request (e.g., a computing device of the client system). Various authentication tools may be utilized by the client system 305 or 307 and the file-based transmission hub 304 to authenticate the client system, such as security tokens and the like, and embodiments of the present disclosure are not intended to be limited to a particular authentication process. It should be understood that if authentication of the sending client system (e.g., 305, 307) fails at step 1a, the registration of step 600 fails/ends. In implementations, the file-based transmission hub 304 (e.g., the error handling module 316) records any failed authentication/registration attempt.

In embodiments, at substep 2a, the file-based transmission hub 304 (e.g., login module 311) registers the client system (e.g., 305, 307) based on the authentication of substep 1a. In embodiments, the login module 311 of file-based transmission hub 304 is configured to register client systems with the file-based transmission hub 304, and provide login services for one or more users of the client systems. Registration of the client system may include saving client system data to a registration database, such as login information, the location of the client system, permissions, etc. Login services may also include providing the client system with login data and/or software tools. In embodiments, the user access module (e.g., 321, 321') of a client system (e.g., 305, 307) is configured to provide login and/or authentication information to the file-based transmission hub 304. The present disclosure is not intended to be limited to a particular registration process.

In further implementations, at step 601, the file-based transmission hub 304 receives a data file from the client system (e.g., 305 or 307) via the UIP protocol 400 in response to a data transfer request received from the client system. In embodiments, the client system is an internal client system 305 of the network platform 306. In implementations, the client system is an external client system 307 outside of the network platform 306. In embodiments, step 601 includes the following substeps 1b-6b.

At substep 1b, the file-based transmission hub 304 (e.g., the API module 310 of the file-based transmission hub 304) receives an authentication message and data transfer request (e.g., an API message) from a sending client system (e.g., 305, 307) regarding a real-time data transfer event, and authenticates the sending client system (e.g., via the authentication module 312) based on the authentication message. In aspects, the data transfer request includes instructions to send a data file to a receiving client system (e.g., 305, 307). In further aspects, the user access module 321 or 321' of the sending client system 305 or 307 sends the authentication message and data transfer request to the API module 310 of the file-based transmission hub 304 at substep 1b.

Various authentication tools may be utilized by the sending client system and the file-based transmission hub 304 to authenticate the sending client system at step 601, such as security tokens and the like, and embodiments are not intended to be limited to a particular authentication process. It should be understood that if authentication of the sending client system (e.g., 305, 307) fails at step 1b, the UIP file transfer protocol 400 of step 601 ends. In implementations, the file-based transmission hub 304 (e.g., the error handling module 316) records any failed authentications attempt.

At substep 2b, the file-based transmission hub 304 uploads the data file sent by the sending client system authenticated at substep 1b. In embodiments, the file transfer module 322 or 322' of the client system 305 or 307 sends the data file to the file managing module 313 of the file-based transmission hub 304, and the file managing module 313 of the file-based transmission hub 304 uploads the data file at substep 2b to the data storage module 314 of the file-based transmission hub 304. The data storage module 314 may store the data file locally at the file-based transmission hub 304, or remotely (e.g., in a distributed storage system).

At substep 3b, the file-based transmission hub 304 receives a message (e.g., an API message) from the sending client system (e.g., 305, 307) indicating that the upload of the data file to the file-based transmission hub 304 has been completed. In embodiments, at substep 3b, the API module 310 of the file-based transmission hub 304 receives an API message from the communication module 320 or 320' of the sending client system 305 or 307 when the file transfer module 322 or 322' of the sending client system determines that the transfer of the data file to the file-based transmission hub 304 has been completed.

At substep 4b, the file-based transmission hub 304 sends the data file to the receiving client system (e.g., an internal or external client system 305 or 307) based on the data transfer request received from the sending client system at substep 1b. In embodiments, the file managing module 313 of the file-based transmission hub 304 sends the data file to the receiving client system at substep 4b. Substep 4b may be implemented with UIP protocols 400 in accordance with embodiments of the present disclosure. For example, the file-based transmission hub 304 may send the data file to an internal client system 305 using the UIP protocol 400 in accordance with step 602, discussed below. Alternatively, file-based transmission hub 304 may send the data file to the receiving client system utilizing a standard file transfer protocol (e.g., SFTP), such as when the receiving client system is an external client system 307 that is not registered to utilize the UIP protocol 400.

At substep 5b, the file-based transmission hub 304 (e.g., the API module 310 of hub 304) receives a notification (e.g., file transfer completed, error message, etc.) regarding the data transfer event from the receiving client system. In one example, the API module 310 of the file-based transmission hub 304 receives an API message from the receiving client system (e.g., one of client systems 305 or 307) indicating that the downloading of the data file from the file-based transmission hub 304 to the receiving client system (e.g., via a file transfer module 322 of the client system) has been completed. In another example, the API module 310 of the file-based transmission hub 304 receives an API message from the receiving client system indicating that an error has occurred. In implementations, the error handling module 316 of the file-based transmission hub 304 is configured to automatically implement functions (e.g., sending notifications, recording errors, etc.) based on stored predetermined error handling rules.

At substep 6b, the file-based transmission hub 304 sends the sending client system (e.g., 305 or 307) a notification regarding the data file transfer event. In embodiments, the notification module 315 of the file-based transmission hub 304 sends the event streaming module 324 or 324' of the sending client system 305 or 307 an API notification. In implementations, the event streaming modules 324, 324' are each in communication with a respective message queuing module 325, 325' configured to queue file transfer events.

In aspects of the present disclosure, the event streaming modules 324, 324' each comprise a centralized messaging system of the client system 305 or 307. In embodiments, the event streaming module 324 or 324' is a Kafka® messaging system. Kafka® is a registered trademark of The Apache Software Foundation. In one example, the notification module 315 of the file-based transmission hub 304 sends the event streaming module (e.g., 324 or 324') of the client system (e.g., 305 or 307) a notification indicating that the data file was successfully transferred to the receiving client system according to the data transfer request. In another example, the notification module 315 of the file-based transmission hub 304 sends the event streaming module of the client system a notification indicating that the file transfer event failed.

At step 602, the file-based transmission hub 304 sends a data file to the client system as part of a data transfer event via the UIP protocol 400. The data file may be, for example, a data file obtained by the file-based transmission hub 304 from another participating client system utilizing UIP protocols 400 according to embodiments of the invention. In implementations, step 602 includes the following substeps 1c-4c.

At substep 1c, after the file-based transmission hub 304 obtains a data file from a source as part of a file transfer event, the file-based transmission hub 304 sends a notification to the receiving client system (e.g., 305 or 307) that a data file is ready to be transmitted to the receiving client system in accordance with the data file transfer event. In implementations, file managing module 313 of the file-based transmission hub 304 obtains the data file from an internal client system 305 or an external client system 307 via the UIP protocol 400 or a standard internet protocol (e.g., SFTP for an external client). In one example, the file-based transmission hub 304 obtains the data file from a client system (e.g., 305, 307) in accordance with step 601 of FIG. 6A. In embodiments, the notification module 315 of the file-based transmission hub 304 sends the notification to the client system at substep 1c.

At substep 2c, the file-based transmission hub 304 receives an authentication message from the receiving client system (e.g., 305 or 307) in response to the notification of substep 1c, and authenticates the receiving client system. In implementations, the API module 310 of the file-based transmission hub 304 receives an API authentication message from the communication module 320 or 320' of the receiving client system 305 or 307, and the authentication module 312 of the file-based transmission hub 304 authenticates the receiving client system at substep 2c. Various authentication tools may be utilized by the receiving client system and the file-based transmission hub 304 to authenticate the receiving client system at substep 2c, such as security tokens and the like, and embodiments not intended to be limited to a particular authentication process. It should be understood that if authentication of the receiving client system (e.g., 305, 307) fails at step 1c, the UIP file transfer protocol 400 of step 602 ends. In implementations, the file-based transmission hub 304 (e.g., the error handling module 316) records any failed authentications attempts.

At substep 3c, the file-based transmission hub 304 sends the data file to the receiving client system (e.g., 305, 307) authenticated at substep 2c. In embodiments, the file managing module 313 of the file-based transmission hub 304 sends the data file to the file transfer module 322 or 322' of the receiving client system 305 or 307 for storage by the data storage module 323 or 323' of the receiving client system. The data storage module 323 or 323' may store the data file locally, or at a remote storage location (e.g., distributed storage location).

At substep 4c, the file-based transmission hub 304 receives a notification from the receiving client system (e.g., 305, 307) regarding the data transfer event. In implementations, the API module 310 of the file-based transmission hub 304 receives an API notification from the communication module 320 or 320' of the receiving client system 305 or 307 indicating that the data file has been successfully downloaded by the receiving client system, or that an error has occurred.

At step 603, the file-based transmission hub 304 sends a status notification to a client system (e.g., 305, 307) utilizing UIP protocol 400 in response to a status inquiry. In embodiments, step 603 includes the following substeps 1d-3d.

At substep 1d, the file-based transmission hub 304 receives an authentication message from a client system (e.g., 305, 307), and authenticates the client system. In embodiments, the API Module 310 of the file-based transmission hub 304 receives an API authentication message from the client system, and the authentication module 312 of the file-based transmission hub 304 authenticates the client system. Various authentication tools may be utilized by the client system and the file-based transmission hub 304 to authenticate the client system at substep 1d, such as security tokens and the like, and embodiments are not intended to be limited to a particular authentication process. Again, it should be understood that if authentication of client system (e.g., 305, 307) fails at step 1d, the UIP file transfer protocol 400 of step 603 ends. In implementations, the file-based transmission hub 304 (e.g., the error handling module 316) records any failed authentications attempts.

At substep 2d, the file-based transmission hub 304 receives a status inquiry message from the client system (e.g., 305, 307), regarding a file transfer event (e.g., the data transfer event transferring the data file). In implementations, the status inquiry message is an API message sent by the communication module 320, 320' of the client system 305 or 307.

At substep 3d, the file-based transmission hub 304 sends a status notification to the client system (e.g., 305, 307) authenticated at step 1d in response to the status inquiry message. In implementations, the notification module 315 of the file-based transmission hub 304 sends the status notification to the client system 305 or 307 to be handled by the file transfer module 322 or 322'. In implementations, the error handling module 316 of the file-based transmission hub 304 records errors or exceptions, and the notification module 315 provides a status notification to the client system based on a recorded error or exception. In aspects, the status notification includes information regarding a point of failure for a file transfer event.

At step 604, the file-based transmission hub 304 repeats UIP protocols for other participating client systems (e.g., 305, 307). It should be understood that file-based transmission hub 304 generating data regarding each of the real-time data transfer events managed by the file-based transmission hub 304 including, for example, the parties to the transactions (e.g., client systems 305, 307) and any points of failure during the real-time data transfer events. In implementations, UIP protocols are utilized for all data file transferring events between internal client systems 305 handled by the file-based transmission hub file-based transmission 304.

In aspects, the data regarding real-time data transfer events includes error tracking data, which may be utilized by the file managing module 313 of the file-based transmission hub 304 to determine a status of a given data transfer event, or by the error handling module 316 of the file-based transmission hub 304 or by the client systems 305 and/or 307 for exception handling and event-driven retry logic. Additionally, in implementations, the data regarding real-time data transfer events may be utilized for auditing and reporting, based on a status of one or more data transfer events. In implementations, the use of authentication at each step 600-603 of the UIP protocol 400 provides a mechanism to enforce security across the network platform 306.

In embodiments, at step 605, the file-based transmission hub 304 (e.g., the error handling module 316 of the file-based transmission hub 304) utilizes error tracking data gathered during the implementation of a UIP protocol 400 to determine a point at which a real-time data transfer event failed (point of failure). For example, the error handling module 316 may determine that a real-time data transfer event failed at: 1) authentication by the sending client system; 2) uploading of a file by the sending client system; 3) authentication of the receiving client system; or 4) downloading of the data file by the receiving client system. In implementations, the status notifications of step 603 may include information regarding errors, such as the point of failure, for example.

Figure 6B:
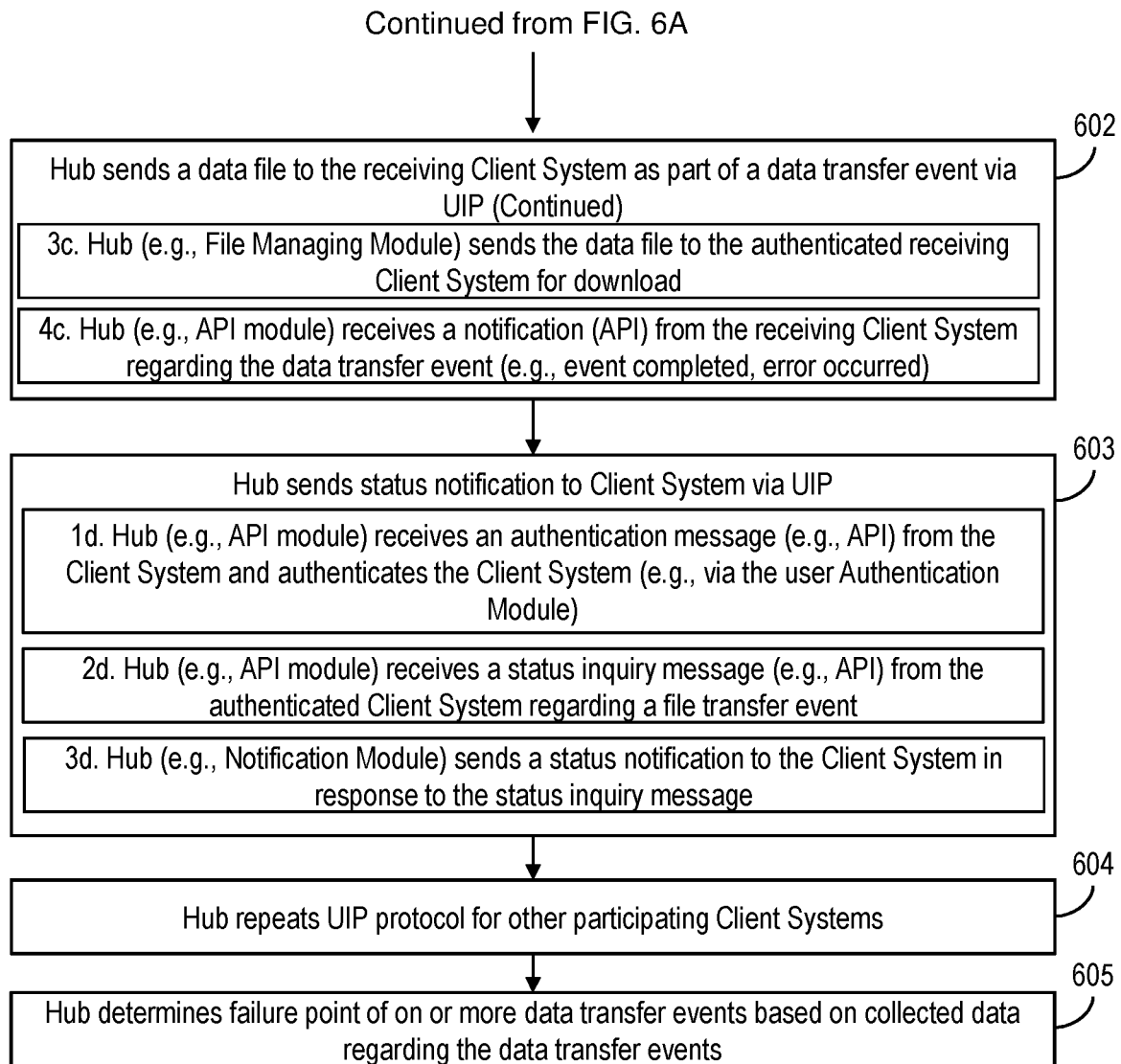
Figure 7:
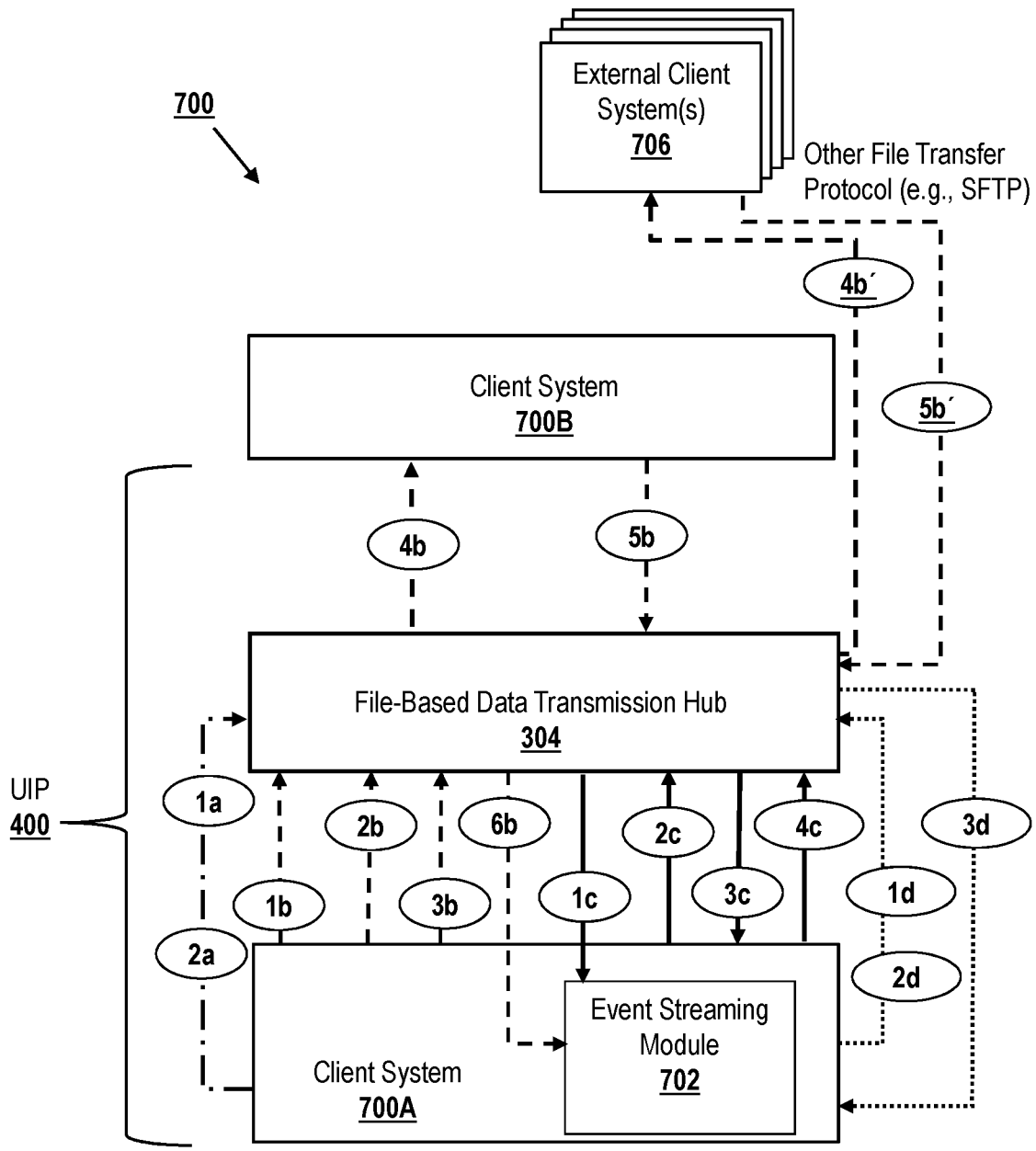
FIG. 7 is a block diagram depicting an exemplary use scenario in accordance with aspects of the present disclosure.

FIG. 7 is a block diagram depicting an exemplary use scenario in accordance with aspects of the present disclosure. UIP protocol 400 substeps discussed with respect to FIG. 6 are depicted in FIG. 7, and the scenario of FIG. 7 may be implemented in the cloud environment of FIG. 2 or other network environment (e.g., LAN, WAN, VPC, etc.). In FIG. 7, a use scenario 700 includes the file-based transmission hub 304 in communication with a plurality of client systems represented by client system 700A and client system 700B. Client system 700A is shown including an event streaming module 702. The client systems 700A and 700B may comprise a plurality of different internal client systems 305 utilizing the UIP protocol 400. In further implementations, the client system 700B represents one or more internal legacy application and client system 700A represents an internal client system utilizing UIP protocol 400. Also, in embodiments, the client systems 700A and 700B may be located on the same functional layer of a cloud computing environment (e.g., workload layer). The event streaming module 702 may comprise one of the event streaming modules 324 or 324' of FIG. 3. The file-based transmission hub 304 is also in communication with external client systems 706 via a standard communication protocol (e.g., SFTP) 708.

Example 1

In a first example, the file-based transmission hub 304 transfers a data file from a sending client system 700A to a receiving client system 700B using UIP protocol 400 for both sides of the transaction. In this example, the client systems 700A and 700B are both internal client systems 305 in the network platform 306. Initially, the file-based transmission hub 304 receives an authentication API message from the sending client system 700A, authenticates the sending client system 700A at sub step 1a, and registers the sending client system 700A at substep 2a. Substeps 1a and 2a are repeated with the receiving client system 700B, such that both the sending client system 700A and the receiving client system 700B are registered with the file-based transmission hub 304.

When the sending client system 700A is ready to transfer a data file to the receiving client system 700B, the sending client system 700A sends an authentication API message and request for a file transfer to the file-based transmission hub 304, and the file-based transmission hub 304 authenticates the sending client system 700A in accordance with substep 1b. The file-based transmission hub 304 uploads the data file from the authenticated sending client system 700A at substep 2b, then receives an API message from the authenticated sending client system 700A when the transfer of the file to the file-based transmission hub 304 is completed, according to substep 3b.

At substep 4b, the file-based transmission hub 304 sends the data file to the receiving client system 700B utilizing the UIP protocol 400. That is, the file-based transmission hub 304: sends a notification to the receiving client system 700B that a data file is ready to be transmitted according to substep 1c; receives an authentication API message from the receiving client system 700B, and authenticates the receiving client system 700B according to substep 2c; sends the data file to the authenticated receiving client system 700B at substep 3c; and receives an API notification from the receiving client system 700B indicating that the downloading of the data file by the receiving client system 700B has been completed at substep 4c. In this case, the file-based transmission hub 304 then sends the sending client system 700A a notification indicating that the requested file transfer event has been completed according to substep 6b.

Example 2

In a second example, the file-based transmission hub 304 registers the sending client system 700A and the receiving client system 700B according to step 600 of FIG. 6b, and obtains the data file from the sending client system 700A in accordance with step 601. However, in this second example, the file transfer between the file-based transmission hub 304 and the receiving client system 700B fails. In this case, the file-based transmission hub 304 sends a notification to the sending client system 700A in accordance with substep 6b of FIG. 6A, indicating that the file transfer event failed.

The sending client system 700A sends an authentication API message to the file-based transmission hub 304, and the file-based transmission hub authenticates the sending client system 700A according to substep 1d, of FIG. 6B and the file-based transmission hub 304 receives a status inquiry API message regarding a status of the file transfer from the sending client system 700A according to substep 2d of FIG. 6B. The file-based transmission hub 304 then sends a status notification to the sending client system 700A including information regarding the status of the file transfer (e.g., type of failure, etc.).

Example 3

In a third example, the client system 700B is a legacy client system that is not registered to use the UIP protocol 400, the sending client system 700A is registered with the file-based transmission hub 304 to use the UIP protocol 400, and the sending client system 700A is sending a data file to the legacy client system 700B. In this example, the sending client system 700A uploads the data file to the file-based transmission hub 304 utilizing the UIP protocols 400 detailed in substeps 1b-6b, but the file-based transmission hub 304 sends the data file to the receiving legacy client system 700B at substep 4b utilizing a standard file transfer protocol (e.g., SFTP).

Example 4

In a fourth example similar to example 3, the sending client system 700A is registered with the file-based transmission hub 304 to use the UIP protocol, and is sending a data file to an external client system 706 that is not registered to use the UIP protocol 400. In this example, the sending client system 700A uploads the data file to the file-based transmission hub 304 utilizing the UIP protocols 400 detailed in substeps 1b-6b, but the file-based transmission hub 304 sends the data file to the receiving client system 706 at substep 4b' utilizing a standard file transfer protocol (e.g., SFTP). In this example, the sending client system 700A may be an insurance system on a human resource management cloud network, and the recipient client system may be a data integration system, such as SmartConnect®, a registered trademark of ADP, Inc.

Example 5

In a fifth example, a sending client system not registered to use the UIP protocol 400 (e.g., a legacy client system 700B or the external client system 706) sends a data file to the file-based transmission hub 304 using a standard file transfer protocol (e.g., SFTP) at step 5b', and the file-based transmission hub 304 sends the data file to a client system 700A as the receiving client, wherein client system 700A is registered to use the UIP protocol 400. Specifically, the file-based transmission hub 304 sends a notification to the receiving client system 700A according to substep 1c, receives an authentication message and authenticates the receiving client system 700A according to substep 2c, sends the data file to the authenticated receiving client system 700A according to substep 3c, and receives an API notification from the receiving client system 700A indicating that the file download has been completed according to substep 4c.

Figure 8:
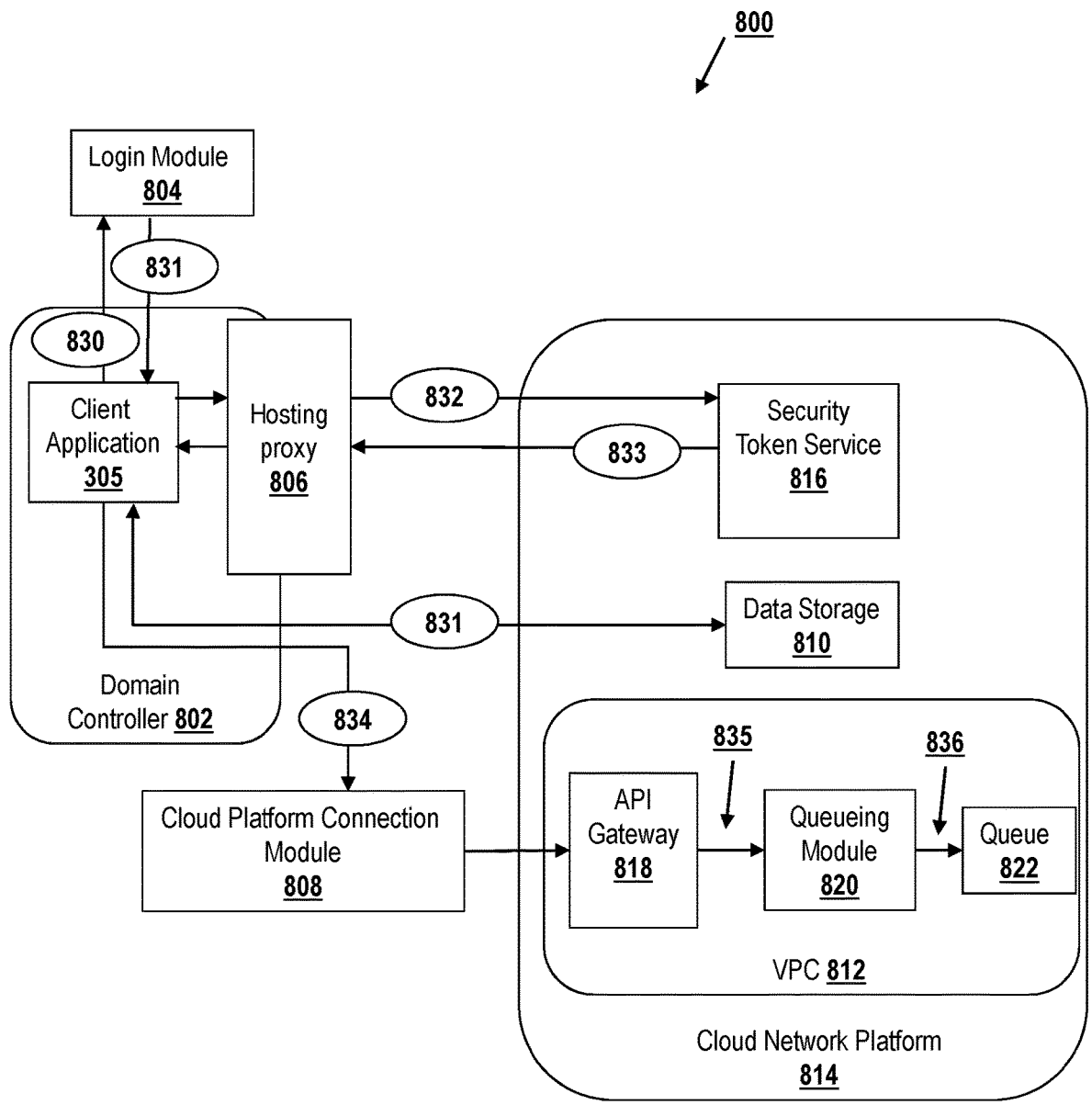
FIG. 8 is an exemplary authentication process for use in implementations of the present disclosure.

FIG. 8 depicts an exemplary authentication process 800 for use in embodiments of the invention. The exemplary authentication process of FIG. 8 may be implemented in the environment 300 of FIG. 3. In the example of FIG. 8, a domain controller 802 is configured to handle security authentication requests from one or more internal client systems 305 of a network platform (e.g., network platform 306 of FIG. 3). In this example, the domain controller 802 manages the flow of authentication data between the internal client system 305, a login module 804, a hosting proxy 806 and a cloud platform connection module 808. The client system 305 is also in communication with data storage 810 of a virtual private cloud (VPC) 812 on a cloud computing platform 814. The hosting proxy 806 is in communication with a security token service 816. In this example, the VPC 812 includes an API gateway 818 in communication with a queueing module 820 managing a job queue 822.

The cloud platform connection module 808 may comprise AWS Direct Connect®, which is a trademark of Amazon- .com, Inc. or its affiliates in the United States and/or other countries. (AWS stands for Amazon Web Services.) The data storage 810 may comprise Amazon Simple Storage Service (Amazon S3®), which is a trademark of Amazon.com, Inc. or its affiliates in the United States and/or other countries.

In implementations, the hosting proxy 806 is in communication with the security token service 816 configured to provide a security token to the client system 305. In embodiments, the security token service 816 comprises the authentication module 312 of FIG. 3. In one example, the security token service 816 comprises Amazon Web Services (AWS) Security Token Service (STS), which is a trademark of Amazon.com, Inc. or its affiliates in the United States and/or other countries.

In the example of FIG. 8, the client system 305 logs into the login module 804 at step 830. In implementations the login module 804 comprises the login module 311 of FIG. 3. In embodiments, the login module 804 comprises Active Directory Federation Services (AD FS), a software component developed by Microsoft Corporation, configured to run on Windows Server operating systems to provide users with single sign-on access to systems and applications across organizational boundaries.

At step 831, the login module 804 sends a login response to the client system 305. In implementations, the response is a Security Assertion Markup Language (SAML) response. SAML is an open standard that allows identity providers to pass authorization credentials to services providers.

At step 832 the client system 305 forwards the response (e.g., SAML response) to the security token services 816 through the hosting proxy 806. At step 833, the client system 305 receives temporary credentials from the security token services 816 via the hosting proxy 806.

At step 834, the client system 305 sends an authentication API based on the temporary credentials to an API gateway 818 via the cloud platform connection module 808. In implementations, the API gateway 818 is an API gateway of the API module 310 of FIG. 3.

At step 835 the API gateway 818 authenticates the client system 305 and communicates the authentication to a queuing module 820 that grants the data storage 810 permission to invoke a function (e.g., uploading or downloading a file), which may be queued in queue 822 at step 836.

At step 836 the authenticated client system 305 executes a function (e.g., uploading a data file to the data storage 810, or to downloading a data file from the data storage 810).

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method for implementing a unified integration pattern (UIP) protocol for file transfers between distinct client systems, comprising:

receiving, by a computer system, an authentication Application Program Interface (API) message and data file transfer request for a first data transfer event from a sending client system in a network of distinct client systems;

authenticating, by the computer system, the sending client system based on the authentication API message and data file transfer request;

uploading, by the computer system, a first data file from the sending client system based on the authenticating the sending client system;

receiving, by the computing system, a notification API message from the sending client system indicating that the uploading of the first data file to the computer system is complete;

sending, by the computer system, the first data file to a receiving client system in the network of distinct client systems based on instructions in the data file transfer request to send the first data file to the receiving client system and the notification API message; and sending, by the computer system, a notification message to the sending client system regarding the first data transfer event in response to the sending the first data file to the receiving client system;

wherein the UIP protocol is repeated for multiple client systems of the network of distinct client systems, thereby generating data regarding additional data file transfer events within the network of distinct client systems, the method further comprising:

generating, by the computer system, error data regarding the additional data file transfer events for use by an error handling module of the computer system in determining a failure point of one or more of the additional data file transfer events; and determining, by the error handling module of the computer system, a failure point of one or more of the additional data file transfer events within the network of distinct client systems based on the error data.

2. The method of claim 1, further comprising:

receiving, by the computer system, an initial authentication API message from the sending client system to be registered with the computer system; and registering, by the computer system, the sending client system as an authorized user.

3. The method of claim 1, wherein the UIP protocol is utilized to send the first data file to the receiving client system, and the sending the first data file to the receiving client system comprises:

sending, by the computer system, to the receiving client system a notification that the first data file is ready to be transmitted;

receiving, by the computer system, a second authentication API message from the receiving client system in response to the notification that the first data file is ready to be transmitted;

sending, by the computer system, the first data file to the receiving client system for downloading by the receiving client system; and receiving, by the computer system, a second notification API message from the receiving client system indicating that the downloading of the first data file has been completed, wherein the notification message indicates to the sending client system that the first data transfer event has been completed.

4. The method of claim 1, further comprising:

receiving, by the computer system, another authentication API message from the sending client system;

authenticating, by the computer system, the sending client system based on the other authentication API message;
receiving, by the computer system, a status inquiry API message from the sending client system in response to the authenticating the sending client system; and
sending, by the computing system, a status notification to the sending client system in response to the status inquiry API message.

5. The method of claim 1, wherein the network of distinct client systems is a human resource management network, the sending client system is an insurance system, and the receiving client system is a data integration system.

6. The method of claim 1, wherein the sending, by the computer system, the first data file to a receiving client system in the network of distinct client systems comprises sending the file via Secure File Transfer Protocol (SFTP) to the receiving client system.

7. A computer program product comprising one or more non-transitory computer readable storage media having program instructions collectively stored on the one or more computer readable storage media, the program instructions executable to cause a client system within a cloud platform to:
perform an unified integration pattern (UIP) protocol for a first real-time data transfer event by:
sending an authentication message and data file transfer request to a file-based data transmission hub for authentication by the file-based data transmission hub, wherein the data file transfer request includes instructions to send a first data file to a receiving client system, and wherein:
the file-based data transmission hub is configured to generate, by the UIP protocol, error data regarding the first real-time data transfer event and additional file transfer events for use by an error handling module of the file-based data transmission hub, and
the error handling module is configured to determine a failure point of the first real-time data transfer event between the file-based data transmission hub and one of a plurality of distinct client systems within the cloud platform based on the error data generated by the UIP protocol;
uploading the first data file to the file-based data transmission hub;
sending a first notification message to the file-based data transmission hub indicating that the uploading of the first data file to the file-based data transmission hub is complete;
receiving a second notification message from the file-based data transmission hub including information regarding a point of failure for the first real-time data transfer event, wherein the point of failure is a step in the UIP protocol;
sending another authentication message to the file-based data transmission hub;
upon authentication of the client system by the file-based data transmission hub based on the other authentication message, sending a status inquiry message to the file-based data transmission hub; and
receiving a status notification from the file-based data transmission hub in response to the status inquiry message.

8. The computer program product of claim 7, wherein the recipient client is a client external of the cloud platform and the data file transfer request includes instructions to send the first data file to the recipient client via a standard internet file transfer protocol.

9. The computer program product of claim 7, wherein performing the UIP protocol for the first real-time data transfer event further comprises: sending an initial authentication message and request for registration to the file-based data transmission hub.

10. The computer program product of claim 7, wherein the UIP protocol is utilized to obtain a second data file from the file-based data transmission hub, wherein the UIP protocol further comprises:
receiving a third notification message from the file-based data transmission hub that the second data file is ready to be transmitted;
sending a second authentication message to the file-based data transmission hub in response to the third notification that the second data file is ready to be transmitted;
upon authentication of the client system by the file-based data transmission hub based on the second authentication message, downloading the second data file from the file-based data transmission hub; and
sending a fourth notification message to the file-based data transmission hub indicating that the downloading of the second data file has been completed.

11. A system comprising:
a processor, a computer readable memory, one or more computer readable storage media, and program instructions collectively stored on the one or more computer readable storage media, the program instructions executable by a computing device to:
perform an unified integration pattern (UIP) protocol for a first data file transfer event by:
receiving an authentication Application Program Interface (API) message and data file transfer request for a first data transfer event from a sending client system in a network of distinct client systems;
authenticating the sending client system based on the authentication API message and the data file transfer request;
uploading a first data file from the sending client system based on the authenticating the sending client system;
receiving a notification API message from the sending client system indicating that the uploading of the first data file to the computer system is complete;
sending the first data file to a receiving client system in the network of distinct client systems based on instructions in the data file transfer request to send the first data file to the receiving client system and the notification API message;
repeating the UIP protocol for multiple client systems of the network of distinct client systems, thereby generating data regarding additional data file transfer events within the network of distinct client systems;
generating error data regarding the additional data file transfer events for use by an error handling module of the computing device in determining a failure point of one or more of the additional data file transfer events; and
determining, by the error handling module, a failure point of one or more of the additional data file transfer events based on the error data.

12. The system of claim 11, wherein performing the UIP protocol for the first data file transfer event further comprises:

receiving an initial authentication API message from the sending client system to be registered with the computer system; and registering the sending client system as an authorized user.

13. The system of claim 12, wherein performing the UIP protocol for the first data file transfer event further comprises:

receiving a second initial authentication API message from the receiving client system to be registered with the computer system; and registering the receiving client system as an authorized user.

14. The system of claim 11, wherein performing the UIP protocol for the first data file transfer event further comprises:

receiving an authentication API message from the sending client system;

authenticating the sending client system based on the authentication API message;

receiving a status inquiry API message from the sending client system in response to the authenticating the sending client system; and sending a status notification to the sending client system in response to the status inquiry API message.

15. The system of claim 11, wherein
the UIP protocol generates data regarding a status of the first data file transfer event and the plurality of additional data file transfer events.

16. The system of claim 11, wherein the network of distinct client systems is a cloud-based network platform providing services to consumers over a cloud network.

17. The system of claim 11, wherein the program instructions are further executable by the computing device to record failed authentication attempts.

18. A system comprising:

a processor, a computer readable memory, one or more computer readable storage media, and program instructions collectively stored on the one or more computer readable storage media, the program instructions executable to:

perform an unified integration pattern (UIP) protocol for a first data file transfer event by:

receiving an authentication Application Program Interface (API) message and data file transfer request from a sending client system in a network of distinct client systems;

authenticating the sending client system based on the authentication API message;

uploading a first data file from the sending client system based on the authenticating the sending client system;

receiving a notification API message from the sending client system indicating that the uploading of the first data file to the computer system is complete;

sending to a receiving client system a notification that the first data file is ready to be transmitted;

receiving a second authentication API message from the receiving client system in response to the notification that the first data file is ready to be transmitted;

authenticating the receiving client system based on the second authentication API message;

sending the first data file to the receiving client system for downloading by the receiving client system based on the authenticating the receiving client system;

receiving a second notification API message from the receiving client system indicating that the downloading of the first data file has been completed; and sending a notification message to the sending client system indicating that the first data transfer event has been completed;

repeat the UIP protocol between other sending client systems and other receiving client systems in the network of distinct client systems for each of a plurality of additional data file transfer events, wherein the UIP protocol generates data regarding a status of the first data file transfer event and the plurality of additional data file transfer events;

wherein the UIP protocol generates error data regarding the first data file transfer event and the additional data file transfer events within the network of distinct client systems for use by an error handling module of the computing device in determining a failure point of one or more of the first data file transfer event and the additional data file transfer events within the network of distinct client systems.

19. The system of claim 18, wherein performing the UIP protocol for the first data file transfer event further comprises:

receiving another authentication API message from the sending client system;

authenticating the sending client system based on the other authentication API message;

receiving a status inquiry API message from the sending client system in response to the authenticating the sending client system; and sending a status notification to the sending client system in response to the status inquiry API message.

20. The system of claim 18, wherein the point of failure is selected from one of the group consisting of: authentication, uploading of a file at issue, and downloading of the file at issue.

* * * * *